US009722511B2

(12) United States Patent
Garces et al.

(10) Patent No.: US 9,722,511 B2
(45) Date of Patent: Aug. 1, 2017

(54) SYSTEMS AND METHODS FOR CONTROLLING AN ELECTRICAL POWER SUPPLY

(71) Applicant: General Electric Company, Schenectady, NY (US)

(72) Inventors: Luis Jose Garces, Niskayuna, NY (US); Juan Antonio Sabate, Niskayuna, NY (US); Di Zhang, Niskayuna, NY (US)

(73) Assignee: GENERAL ELECTRIC COMPANY, Niskayuna, NY (US)

( * ) Notice: Subject to any disclaimer, the term of this patent is extended or adjusted under 35 U.S.C. 154(b) by 467 days.

(21) Appl. No.: 13/711,483

(22) Filed: Dec. 11, 2012

(65) Prior Publication Data

US 2014/0160818 A1    Jun. 12, 2014

Related U.S. Application Data

(60) Provisional application No. 61/734,743, filed on Dec. 7, 2012.

(51) Int. Cl.
*H02M 7/5395* (2006.01)
*H02M 7/5387* (2007.01)

(52) U.S. Cl.
CPC ..... *H02M 7/5395* (2013.01); *H02M 7/53871* (2013.01)

(58) Field of Classification Search
CPC .................................................. H02M 7/5395
USPC ........................................ 363/40, 41, 97, 98
See application file for complete search history.

(56) References Cited

U.S. PATENT DOCUMENTS

| 3,971,972 | A | * | 7/1976 | Stich | 318/811 |
|---|---|---|---|---|---|
| 4,511,835 | A | * | 4/1985 | Studtmann | 318/700 |
| 5,027,285 | A | * | 6/1991 | McCartney et al. | 702/58 |
| 5,450,306 | A | * | 9/1995 | Garces et al. | 363/41 |
| 5,481,166 | A | * | 1/1996 | Moreira | H02P 6/187 318/400.04 |
| 5,872,710 | A | * | 2/1999 | Kameyama | 363/95 |
| 6,005,364 | A | * | 12/1999 | Acarnley | 318/632 |
| 6,486,726 | B1 | * | 11/2002 | Worley et al. | 327/514 |

(Continued)

OTHER PUBLICATIONS

Seyezhai, "Development of SiC BJT based PWM Inverter for Renewable Energy Resources", Nov.-2011, International Journal of Scientific & Engineering Research, vol. 2, ISSN 2229-5518, pp. 1-8.*

(Continued)

*Primary Examiner* — Emily P Pham
(74) *Attorney, Agent, or Firm* — John P. Darling (57) ABSTRACT

Systems and methods for controlling an electrical power supply are provided. One system includes an input configured for receiving voltage measurement signals for the power supply and a controller for one or more electrical phases of the power supply. The controller includes an integrator configured to integrate the received voltage measurement signals and to generate integrated control signals or integrated error signals. The controller is configured to generate an output signal using the integrated control signals or the integrated error signals. The system also includes an output configured to output the output signal to control switching of the power supply.

20 Claims, 8 Drawing Sheets

(56) References Cited

U.S. PATENT DOCUMENTS

| | | | |
|---|---|---|---|
| 6,538,404 B2* | 3/2003 | Kato | H02P 6/182 318/139 |
| 6,784,932 B1* | 8/2004 | Okamoto | H04N 5/3658 250/208.1 |
| 6,924,993 B2 | 8/2005 | Stancu et al. | |
| 6,950,321 B2 | 9/2005 | Stancu et al. | |
| 7,035,124 B2* | 4/2006 | Chadwick et al. | 363/40 |
| 7,177,165 B2 | 2/2007 | Deng et al. | |
| 7,227,331 B2* | 6/2007 | Galli | D06F 37/42 318/805 |
| 7,573,218 B2* | 8/2009 | Yu | H02P 6/18 318/400.13 |
| 7,660,135 B2 | 2/2010 | Fang | |
| 7,679,941 B2 | 3/2010 | Raju et al. | |
| 7,787,270 B2 | 8/2010 | NadimpalliRaju et al. | |
| 7,920,393 B2* | 4/2011 | Bendre et al. | 363/39 |
| 8,228,699 B2* | 7/2012 | Iwata et al. | 363/132 |
| 8,558,497 B2* | 10/2013 | Wright | 318/599 |
| 2001/0054883 A1* | 12/2001 | Rincon-Mora | 323/280 |
| 2002/0135344 A1* | 9/2002 | Tamai et al. | 323/283 |
| 2005/0063205 A1 | 3/2005 | Stancu et al. | |
| 2005/0143846 A1* | 6/2005 | Kocher et al. | 700/34 |
| 2006/0126367 A1* | 6/2006 | Hesterman | 363/89 |
| 2006/0179859 A1* | 8/2006 | Nakata et al. | 62/228.1 |
| 2007/0247121 A1* | 10/2007 | Wu et al. | 323/222 |
| 2010/0019742 A1 | 1/2010 | Li et al. | |
| 2010/0141188 A1* | 6/2010 | Kakebayashi et al. | 318/400.3 |
| 2010/0172166 A1* | 7/2010 | Singh et al. | 363/131 |
| 2011/0141786 A1* | 6/2011 | Shen | H02M 7/487 363/131 |
| 2013/0126482 A1* | 5/2013 | Etoh et al. | 219/69.1 |

OTHER PUBLICATIONS

O'Neill, "Silicon Carbide", Power Electronics Technology, Jan. 2005.

Karutz et al., "Ultra Compact Three-phase PWM Rectifier", Applied Power Electronics Conference, APEC 2007—Twenty Second Annual IEEE, pp. 816-822, Feb.-Mar. 2007, Location: Anaheim, CA, USA.

Lai et al., "A Systematic Topology Evaluation Methodology for High-Density Three-Phase PWM AC-AC Converters", IEEE Transactions on Power Electronics, vol. 23, Issue 6, pp. 2665-2680, Nov. 2008.

Lai, "Analysis and Design for a High Power Density Three-Phase AC Converter Using SiC Devices", VPISU PhD dissertation, Dec. 10, 2008, Location: Blacksburg, Virginia.

Empringham et al., "Power Density Improvement and Robust Commutation for a 100 KW Si-SiC Matrix Converter", Power Electronics and Applications, 2009. EPE '09. 13th European Conference, pp. 1-8, Sep. 8-10, 2009, Location: Barcelona.

Takao et al., "3-Level Power Converter with High-Voltage SiC-Pin Diode and Hard-Gate-Driving of IEGT for Future High-Voltage Power Conversion Systems", Applied Power Electronics Conference and Exposition (APEC), 2010 Twenty-Fifth Annual IEEE, pp. 1101-1107, Feb. 21-25, 2010, Location: Palm Springs, CA.

Empringham et al., "Calorimetric Comparison of the Use of Silicon Carbide Diodes in a 100 KW Matrix Converter for Aerospace Applications", Power Electronics and Applications (EPE 2011), Proceedings of the 2011-14th European Conference, pp. 1-7, Aug.-Sep., 2011, Location: Birmingham.

Ziogas, Phoivos D., "The Delta Modulation Technique in Static PWM Inverters", IEEE Transactions on Industry Applications, vol. 1A-17, No. 3, Mar./Apr. 1981 pp. 199-204.

* cited by examiner

FIG. 15

SYSTEMS AND METHODS FOR CONTROLLING AN ELECTRICAL POWER SUPPLY

CROSS REFERENCE TO RELATED APPLICATIONS

This application claims priority to and the benefit of the filing date of U.S. Provisional Application No. 61/734,743 filed Dec. 7, 2012, the subject matter of which is herein incorporated by reference in its entirety.

BACKGROUND

Aircraft include more and more electronics on board that require additional electrical power for operation. The electrical power sources for these electronics, as well as the components forming the electronics add weight to the aircraft. As a result, the cost of carrying, for example, the additional generators and electrical components onboard the aircraft is an increasing part of the fuel cost.

One way to reduce the fuel cost is to make the electronic components smaller and/or lighter. For example, to reduce the size and/or weight of the power electronics, the operating pulse-width modulation (PWM) frequency of the power switches (IGBT's, FET's, etc.) may be increased. Additionally, using silicon carbide (SiC) based power components, the power converters in the electric drives and power supplies may be operated at higher frequencies to provide faster switching, such as with PWM frequencies in the hundreds of KHz. Operation at these higher frequencies allows for a reduction of the size and weight of these components by using smaller passive components in the filters connected at outputs of these components. For example, a size reduction may be accomplished by increasing the filter cut-off frequencies, which consequently, reduces the size of the capacitors and inductors that are used.

The reduction and/or optimization in size results in an increase in the complexity and speed of the controllers required to eliminate undesired oscillations of the controlled variables. These oscillations may be reduced or eliminated with additional damping resistors within the filters. However, the addition of the damping resistors reduces system efficiency and increases the heat that has to be eliminated from the apparatus. Alternatively, active damping may be added directly in the control. However, in conventional architectures, this active damping requires very fast sampling times of the processors.

BRIEF DESCRIPTION

In one embodiment, a control system for a power supply is provided. The control system includes an input configured for receiving voltage measurement signals for the power supply and a controller for one or more electrical phases of the power supply. The controller includes an integrator configured to integrate the received voltage measurement signals and to generate integrated control signals or integrated error signals. The controller is configured to generate an output signal using the integrated control signals or the integrated error signals. The control system also includes an output configured to output the output signal to control switching of the power supply.

In another embodiment, a power supply is provided that includes a power source and a switching device configured to control switching of the power source. The power supply also includes a controller connected to the switching device and configured to receive voltage measurement signals for the power source and integrate a voltage of the voltage measurement signals or integrate a voltage error of the voltage measurement signals to generate a control signal to control operation of the switching device.

In yet another embodiment, a method for controlling switching of a power supply is provided. The method includes obtaining voltage measurements for the power supply, wherein the voltage measurements are square wave signals. The method also includes integrating the voltage measurements and controlling switching of the power supply using the integrated voltage measurements.

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of systems and methods described and/or illustrated herein provide control of electrical power, for example control of three-phase power, such as supplied on-board an aircraft. However, the various embodiments may be used to control power in different settings or applications, including in non-aircraft applications. At least one technical effect of various embodiments is providing an electrical power supply controller operating with a pulse-width modulation (PWM) frequency of several hundred kilohertz (kHz) that may be implemented in a field-programmable gate array (FPGA). At least one other technical effect is providing a controller for electrical power with increased operating PWM frequency having a simplified design that allows for the use of smaller electronic components, thereby reducing overall size and weight.

It should be noted that while various embodiments may be described in connection with a particular power supply controller or switch, the various embodiments may be implemented in connection with different power supplies. For example, various embodiments provide a controller for a three phase, four wire, constant output voltage 400 Hz power supply that is fed by a silicon carbide (SiC) inverter operating with a PWM frequency of several hundred kHz (e.g., 200-500 kHz). The controller in various embodiments is implemented without a digital signal processor (DSP) or micro-processor and provides a very small sampling time (e.g., in the order of 4-10 micro-seconds) to sample, regulate the output under different kinds of disturbances and attenuate any high frequency oscillations (e.g., oscillations of an un-damped LC low pass filter).

The controller of various embodiments that is implemented in an FPGA also does not use complicated vector operations on the voltages and currents or the hardware to implement the PWM. In one embodiment, no coordinate transformation or current or voltage regulators in rotating or stationary coordinates are used. Instead, the control is based on a simple Bang-Bang (hysteresis) control of the volt-seconds measured at the output of the PWM converter as described in more detail herein.

In particular, various embodiments may be provided in connection with a voltage source to be controlled (including 4-wires) that allows complete decoupling in the regulation of the three legs of the controlled converter. Various embodiments, including a description of the generation of the PWM signals for one leg will now be described. It should be noted that the decoupling allows the use of this control for unbalanced loads or even single phase loads, as long as the split DC link voltage supply is able to accept the increase in ripple. Accordingly, various embodiments control, for example, three phase power, such as for a 400 Hz constant voltage power supply for an aircraft. It should be noted that various embodiments may be implemented for different power supply configurations, such as a 4-leg inverter, which is a topology more able to account for a DC link imbalance.

In general, various embodiments regulate or control the integral of one or more voltages (e.g., the three voltages in a 3-phase power supply) or the integral of an error of a volt-seconds output instead of regulating or controlling the actual voltage of the power supply. Accordingly, in some embodiments, a controller is provided that is implemented in an FPGA that uses a comparator instead of a linear regulator.

Figure 1:
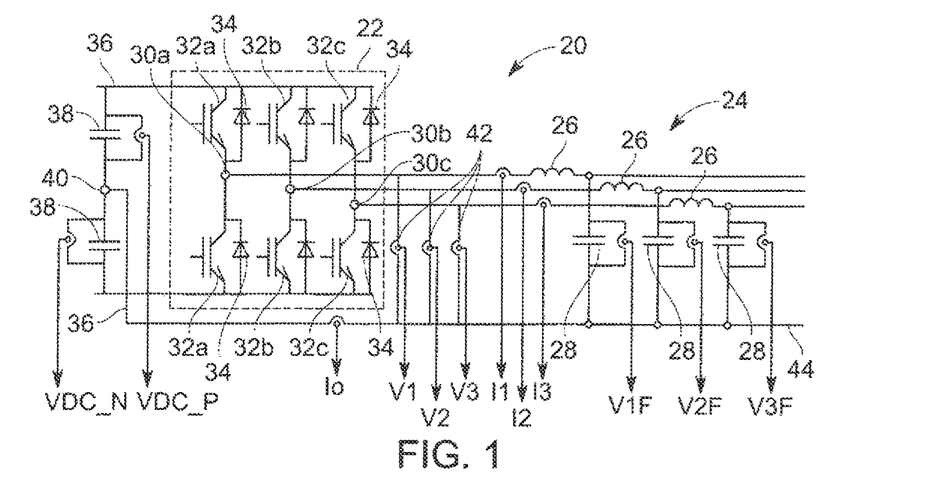
FIG. 1 is a schematic illustration of a voltage control arrangement in accordance with various embodiments.

More particularly, FIG. 1 is a schematic diagram of a voltage control arrangement (or control system) 20 in accordance with various embodiments. The voltage control arrangement 20 includes a converter 22, which in one embodiment is a PWM converter, such as SiC PWM converter. The converter 22 operates to provide fast switching, such as switching at 200 kHz or 400 kHz. The voltage control arrangement 20 also includes an LC filter 24 coupled to the output of the converter 22, which is used to acquire voltage and/or current measurements to control the supply of power.

The LC filter 24 includes for each leg of the 3-phase power an inductor (L) 26 and capacitor (C) 28. For example, as illustrated, a series connection of the inductor 26 and capacitor 28 to a corresponding terminal 30a, 30b, 30c is provided. Each of the terminals 30a, 30b, 30c is connected between a respective pair of transistors legs 32a, 32b, 32c, respectively, that are together connected forming a three phase PWM source. The transistors 32a, 32b, 32c may be, for example, insulated gate field-effect transistors (IGFETs) having a blocking diode 34 connected between a respective emitter of the transistor 32a, 32b, 32c and one of a pair of common lines 36.

The common lines 36 have a pair of capacitors 38 connected therebetween together forming a DC link capacitor with a neutral connection for the three phase load, such that in this configuration voltage measurements are referenced to a center tap 40 of the DC link capacitor. In operation, the output voltages V1F, V2F and V3F may be at a constant frequency and voltage to generate a sinusoidal wave output for voltage supply control. As can be seen in FIG. 1, current measurements (I1, I2, I3) are obtained at the output of the converter 22 prior to the LC filter 24, which also includes the power terminals 42 for each of the legs for the 3-phase power that may be controlled using the voltage control arrangement 20.

Figure 2:
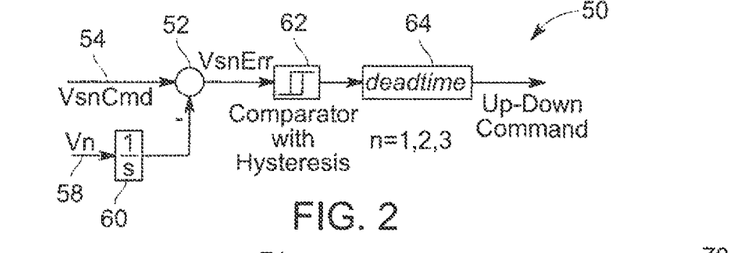
FIG. 2 is a block diagram of a volt-seconds controller in accordance with one embodiment.
Figure 3:
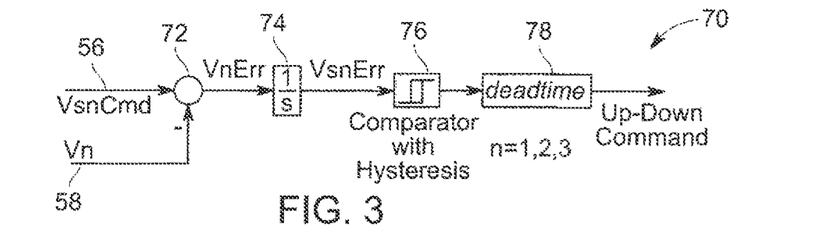
FIG. 3 is a block diagram of a volt-seconds controller in accordance with another embodiment.

More particularly, various embodiments provide a volt-seconds controller 50 or a volt-seconds controller 70 as shown in FIGS. 2 and 3, respectively, that controls the switching of the converter 22. In operation, the volt-seconds controller 50 or 70 uses the measured voltages (V1, V2, V3) at each of the three terminals 30 of the PWM converter 22 with respect to a fourth wire 44, which is connected to the center tap 40 of the DC link feeding the supply. In operation the volt-seconds controller 50 is configured to control the integral of the voltage and the volt-seconds controller 70 is configured to control the integral of the error as described in more detail below.

Specifically, in one embodiment, a three phase oscillator (not shown) generates sinusoidal commands for the output voltage (volt-seconds signal (VsnCmd) or volts signal (VnCmd)) that are 120 degrees phase shifted, 400 Hz sinusoidal signals of constant amplitude, scaled to match the voltage measurements. Each of the volt-seconds controllers 50 and 70 includes a comparator, configured as a subtractor 52 and 72, respectively, that compares the command signals 54 and 56 with the measured voltage Vn, which are the measured voltages (V1, V2, V3) in FIG. 1.

With respect to the volt-seconds controller 70, the difference between the command signals 54 and the actual measured voltage 58 (voltage error VsnErr in FIG. 3) is input to a unity gain integrator 74 (or other scaled integrator). In this configuration, the output represents the volt-seconds error (VsnErr) to be regulated. In the volt-seconds controller 50 of FIG. 2, illustrating a different implementation of the same function, the measured output voltage is first input to a unity gain integrator 60, the output of which represents the volts second feedback. The feedback signal is then subtracted from a three phase signal representing the volt-seconds command by the subtractor 52 to generate the volt-second errors (VsnErr).

Thereafter, in both embodiments (FIGS. 2 and 3), the error signals (VsnErr) for each of the phases (three in this example) are then input to three comparators with hysteresis, represented by the device 62 and 76, respectively, that then generate the logic signals that will become the up-down commands for the power switches, such as the transistors 32 of the converter 22 shown in FIG. 1. It should be noted that the up-down commands are passed through logic (illustrated as the deadtime generators 64 and 78) to provide a constant delay between turning off a switch of a leg and turning on another leg of the voltage control arrangement 20. Thus, the volt-seconds controller 50 is configured to integrate the voltage signal and the volt-seconds controller 70 is configured to integrate the error in the measured volt-seconds output.

In operation, the volt-seconds controllers 50 and 70 receive voltage measurements (Vn), which in various embodiments are square wave signals, and are configured to generate a pulse train of variable frequency. It should be noted that if the subtractor 52, 72 is implemented with a constant and fixed hysteresis band, the time between pulses will change as a function of the slope of the voltage commands. Accordingly, the frequency will be low when the slope of the voltage command is low and fast at the peak. In various embodiments, in order to operate the converter 22 with a constant and determined switching frequency (to be able to better predict the losses due to the current amplitude and the switching), the PWM frequency is maintained relatively constant by changing the hysteresis band as a function of the voltage command (VsnCmd signal or VnCmd signal) as described in more detail herein. It should be noted that a similar effect is achieved if the volt-seconds error signal is multiplied by a function of the sinusoidal voltage or volt-seconds command and sent to the subtractor 52 or 72 with a constant hysteresis band.

Figure 4:
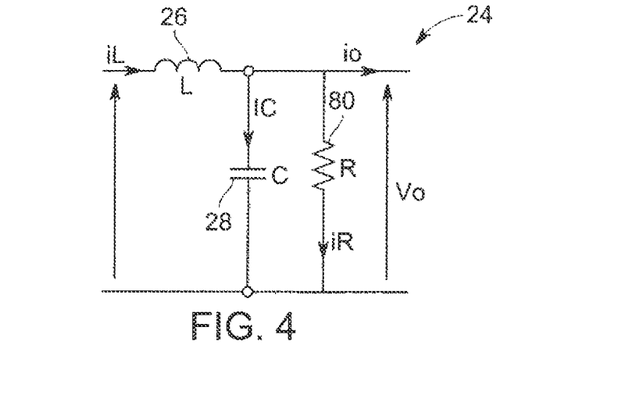
FIG. 4 is a schematic illustration showing a resistive component in a filter in accordance with an embodiment.

FIG. 4 illustrates an output filter for one phase of the voltage control arrangement 20, in particular, the LC filter 24. It should be noted that an output filter is coupled to each of the legs of the voltage control arrangement 20. The output filter is configured to provide damping operation in various embodiments.

As described herein, the output filter, namely the LC filter 24, includes the inductor 26 and the capacitor 28. In operation, the inductor 26 limits the maximum dI/dt of the converter current, which limits the converter switching losses and limits the maximum peak current for the case of a short at the supply terminals. As described herein, no damping resistor is used in order to keep the efficiency of the source to a maximum. Accordingly, in various embodiments, "active damping" is used where the control has to mimic, for example, the behavior of the resistance with additional loops (e.g., a virtual resistor). Thus, the functionality of a resistive element is added to the filter topology in various embodiments to create the virtual resistance.

For example, in one embodiment, as illustrated in FIG. 4, a resistor 80 is connected in parallel with the capacitor 28. However it should be noted that the resistor 80 may be added as a series or parallel resistor to the filter inductor 26 or to the capacitor 28. If used in the inductor 26 and sized appropriately, the resistor 80 dampens oscillations coming from disturbances produced by the converter 22, but does not operate as well to dampen disturbances coming from the load. If the resistor 80 is connected in parallel with the output capacitor 28, the current is proportional to the capacitor voltage. An equivalent block diagram 90 in the s-domain is shown in FIG. 5.

Figure 5:
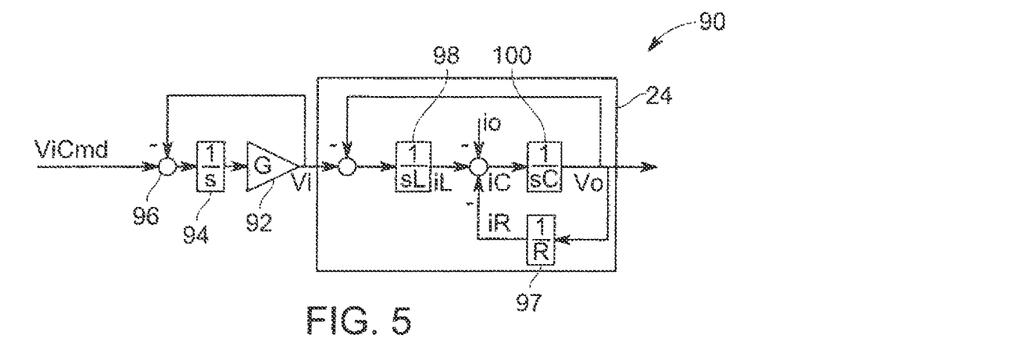
FIGS. 5-8 are equivalent block diagram showing the resistive component of FIG. 4 as a real and as a virtual resistance.

In FIG. 5, the PWM converter 22 of FIG. 1 and the corresponding hysteresis is illustrated as a gain block 92 with a unity gain integrator 94 connected to an input thereof. The input of the unity gain integrator 94 is connected to a comparator 96 that also receives as an input the output of the gain block 92. The diagram 90 is an equivalent diagram for the circuit with a resistive element 97 (e.g., corresponding to the resistor 80) in series/parallel with an inductive element 98 and a capacitive element 100, which may correspond to the inductor 26 and capacitor 28 (shown in FIG. 4).

Figure 6:
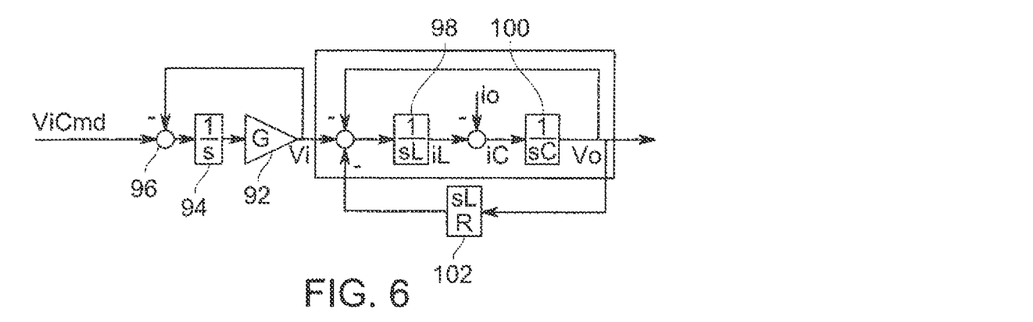
Figure 7:
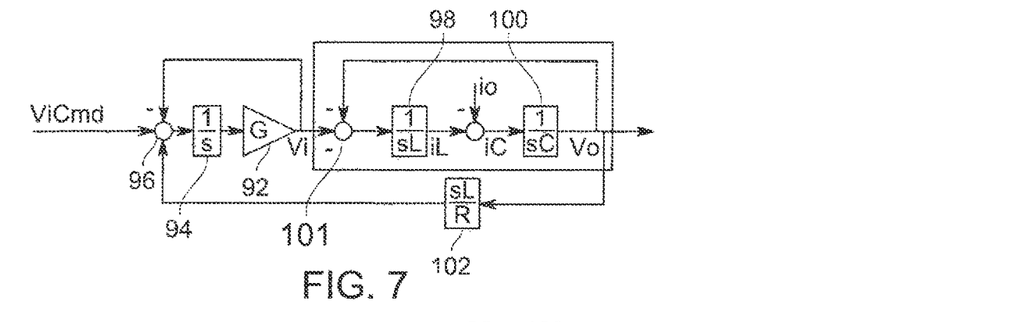

If the damping effect is to be replaced by control signals, then the resistive element 97 (the block symbolizing the resistor) can be brought closer to the controller section 102 as illustrated in FIG. 6. Accordingly, the damping effect may be obtained by subtracting a signal proportional to the derivative of the measured output voltage from the voltage command signal using the comparator 96 as shown in FIG. 7 (where the controller section 102 provides a feedback signal to the comparator 96) and from the output of the gain block 92 using the comparator 101. Thus, the output adds another input to the integrator acting as the real resistance, but not adding to the losses in the circuit.

Figure 8:
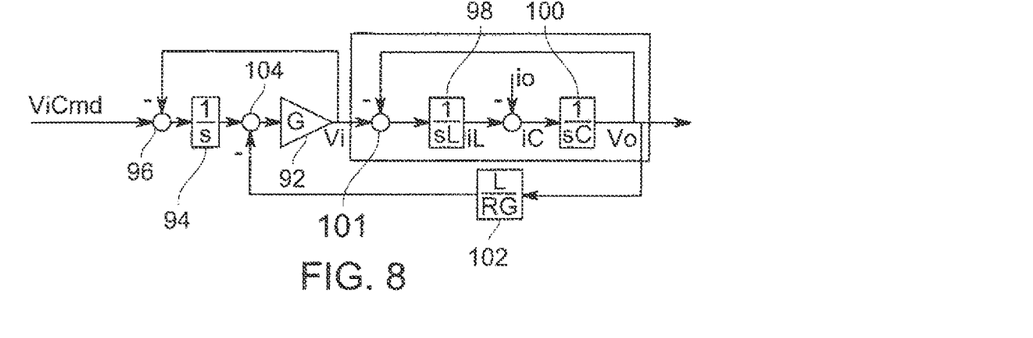

For example, FIG. 7 illustrates that the high frequency part of the output voltage has higher importance (gain) in the contribution to the damping effect. However, it is not desirable to use noisy derivatives of signals within the controller section 102. Accordingly, in one embodiment, the damping signal is provided to the output of the unity gain integrator 94 as shown in FIG. 8, which is illustrated as combined using a comparator 104. However, in one embodiment, instead of the total output voltage, only the error between the desired and actual value is fed back to obtain the desired damping effect. It should be noted that this feedback signal, if not filtered or delayed, includes all the desired high frequency part that acts to reduce the oscillations.

Figure 9:
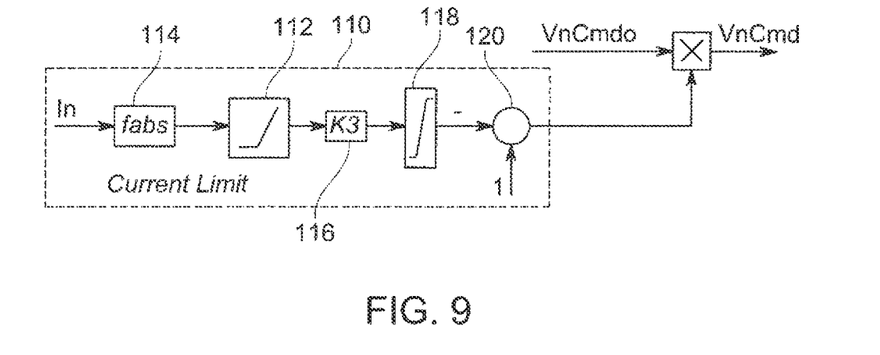
FIG. 9 is a block diagram of a dead-zone module in accordance with an embodiment.

Referring now to the measurement of currents with the voltage control arrangement 20, the current is measured at each of the lines of the converter 22 before the LC filter 24 (I1, I2, I3 in FIG. 1) to act as a protection and ground fault detector. In one embodiment, the absolute value of each current is fed through a dead-zone module 110 as shown in FIG. 9. The dead-zone module 110 has a non-zero output only when the current exceeds a pre-determined limit value. This dead-zone module 110 output is used to reduce the voltage command for the corresponding phase with the appropriate gain. As shown in FIG. 9, a dead band component 112 receives a floating absolute value of the current signal (fabs) 114. The dead band component 112 blocks the current unless the current is larger than a predetermined amount (limit value). A gain component 116 then applies a gain 114 (illustrated as scaled with a gain of K3), which is fed through a limiter 118. The output of the limiter 114 is subtracted from an input unity signal of "1" with a subtractor 120, which is then combined with an initial command signal (VnCmdo) to generate the command signal (VnCmd). Accordingly, in operation the dead-zone module 110 operates as a protective element limiting the maximum output current from the inverter. For example, depending on the connected device (e.g., a radar), the system may stop operating and a short would then form generating excessive output currents without the dead band component 112.

Figure 10:
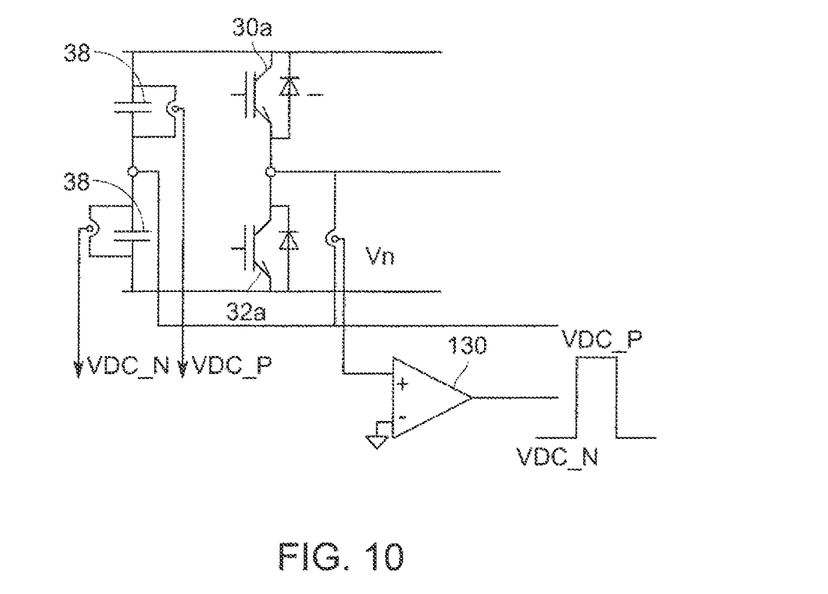
FIG. 10 is a schematic illustration showing an arrangement for acquiring voltage measurements in accordance with various embodiments.

In operation, the voltage control arrangement 20 acquires measurements of the three converter output voltages (V1, V2, V3), each of the filter outputs (V1F, V2F, V3F) and the converter current (I1, I2, I3). It should be noted that the capacitor voltage and the currents are signals that do not need a large bandwidth for acquisition thereof. However, the converter output voltage is a PWM signal with very high dV/dt and accordingly very difficult or almost impossible to measure with a conventional A/D, especially for the application where this signal is used to generate the PWM output. To reduce the hardware requirements, a comparator 130 may be used (shown in FIG. 10) to measure the time when the output voltage has a transition from low to high voltage and together with the measured DC link voltages can generate a signal representing the voltage across the inverter terminals for the voltage control. It should be appreciated that these signals do not reconstitute exactly the output voltages, especially under zero or very light current conditions, but together with the corrections introduced by the damping circuit, can closely generate the output voltages with a desired or required accuracy.

It also should be appreciated that because the time in which the signal is measured is known, the signal can be measured without a fast A/D converter. For example, the time when the signal is off corresponds to the VDC_N signal and the time when the signal is on corresponds to the VDC_P signal. Accordingly, in operation, the voltages can be reconstructed by measuring the time at which the switches (e.g., transistors 32 shown in FIG. 1) turn on and off as well as measuring the VDC_N (which is constant) and VDC_P signals.

Figure 11:
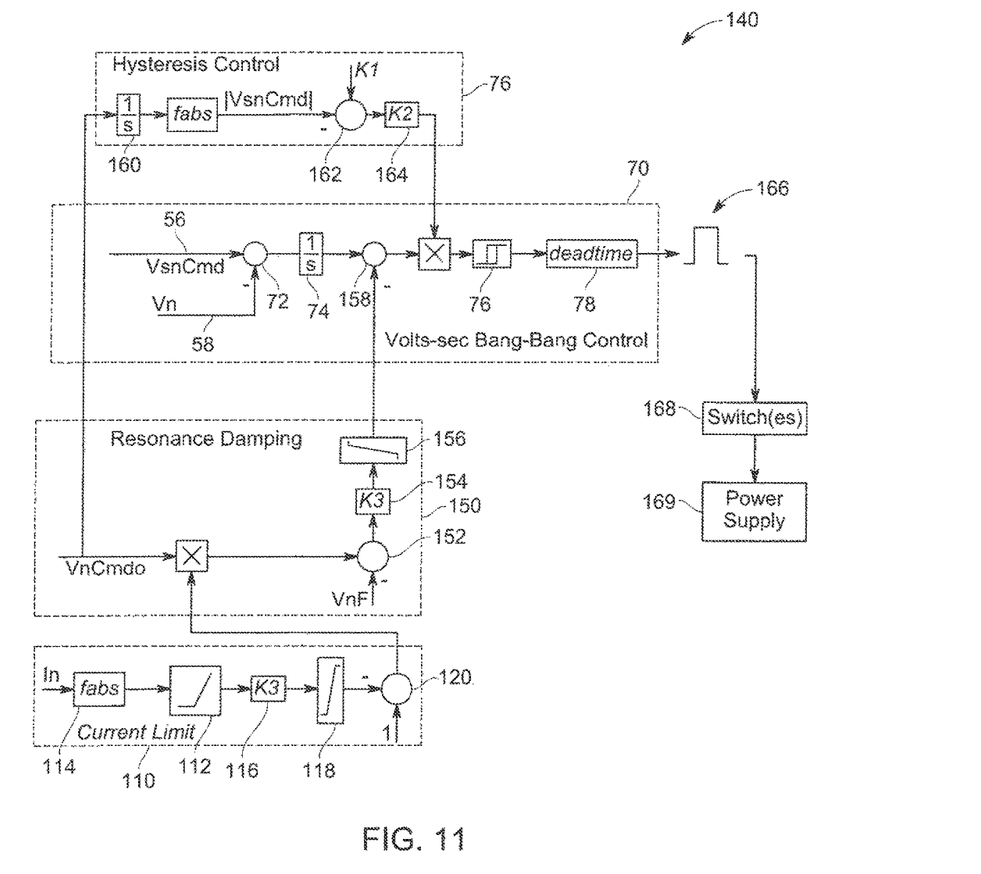
FIG. 11 is a block diagram of a control system in accordance with an embodiment.

FIG. 11 is a block diagram of a control system 140 for one of the three phases indicated with the index n and formed in accordance with various embodiments, which combines the various components described herein, wherein like numerals represent like parts. The control system 140 is provided for each of the phases of the power supply. The control system 140 may be implemented in a simple design, such as in an FPGA using counters for the integrators and digitally controlled oscillators.

As can be seen, the dead-zone module 110 is used as a protection circuit for the voltage command signal provided to the volt-seconds controller 70 (the volt-seconds controller 50 may be used instead) through a resonance damping circuit 150. In particular, the resonance damping circuit 150 combines the scaled current signal from the dead-zone module 110 with the initial voltage command signal (VnCmdo), which then has the measured voltage signal (VnF) subtracted therefrom by a subtractor 152 (e.g., a comparator configured to perform subtraction). The output of the subtractor 152 is scaled by a gain component 154 (illustrated as scaled with a gain of K3 similar to the gain in the dead-zone module 110). The output of the gain component is connected to a limiter 156 that limits the output of the signal to the volt-seconds controller 70.

As further illustrated in FIG. 11, in this embodiment, the output of the unity gain integrator 74 is combined with the output of the limiter 156 of the resonance damping circuit 150 with a subtractor 158. In particular, the signal from the output of the limiter 156 is subtracted from the unity gain integrator 72, which is then combined with the signal from a hysteresis control, which may be implemented as the device 76 (shown in FIG. 3). In the illustrated embodiment, the device 76 includes a unity gain integrator 160 (as a Laplace for the integral in one example) that receives the command signal (VnCmdo) and outputs the absolute value of the integrated signal (which is a floating absolute value (fabs), |VsnCmd|) to a subtractor 162 wherein a gain value (illustrated as K1) has subtracted therefrom the |VsnCmd| signal. Thereafter, the signal is scaled by a gain component 164 (illustrated as a gain of K2), with the scaled signal combined with the output signal from the subtractor 158 (which may be a comparator) within the volt-seconds controller 70. Thus, in operation, the device 76 changes the band of the hysteresis such that the output frequency of the subtractor 158 is constant. For example, the slope of the sine wave signal is almost zero at the peak such that the output signal will be fast at the peak and slower at the zero crossing. Thus, to get the same frequency at the output, the value of the hysteresis is changed.

Using the control system 140, a square wave output signal 166 is generated for each phase, such that three square wave output signals 166 are generated in one embodiment to control one or more switches 168 for switching on and off one or more phases of a power supply 169. Thus, switching is provided at the same time, but at slightly different frequencies. It should be noted that the power supply 169 may a single or multi-phase power supply.

Figure 12:
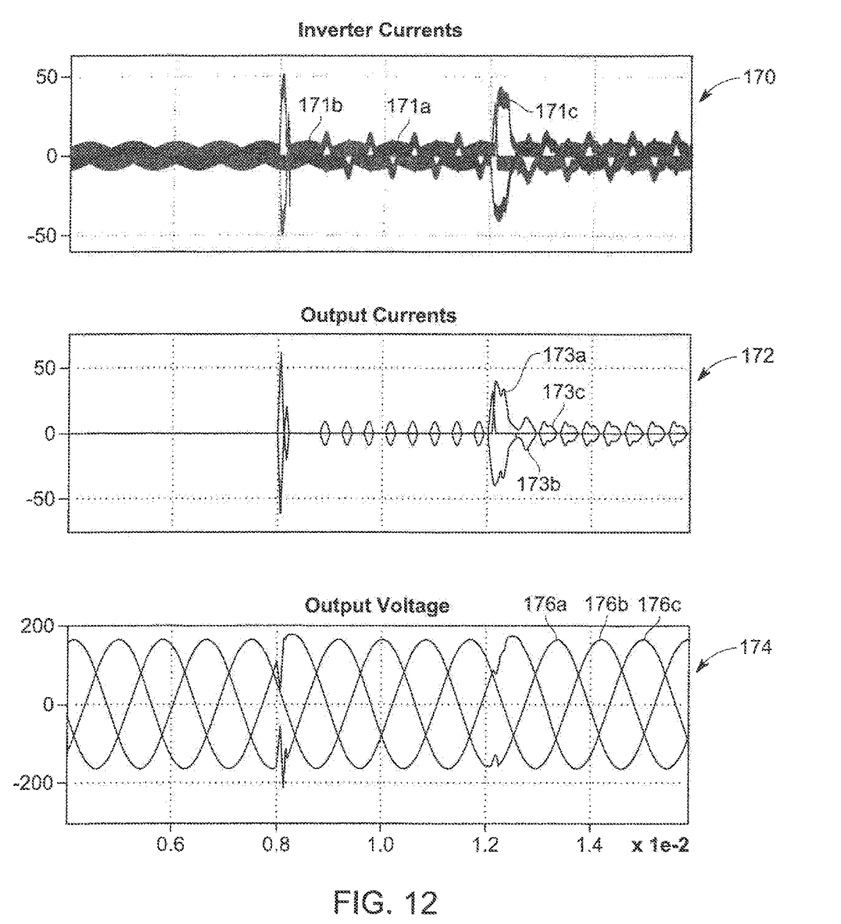
FIG. 12 depicts graphs showing the results of a simulation in accordance with various embodiments.

The graphs 170, 172 and 174 of FIG. 12 illustrate a simulation for the various embodiments. The commanded frequency in this example is 400 Hz and the commanded voltage is 210 V Line to line. The load for the system is non linear and represents an active load with a diode rectifier. The results are simulated and not actual results. In the simulation, at time t=8 ms, a first non linear load is connected to the output of the voltage source and at time t=12 ms a second non linear load is connected to the output of the voltage source. The graphs 170, 172 and 174 correspond to the converter currents, the current at the output of the filter and the capacitor voltages, respectively. It should be noted that the effect of the current limit is seen at the time of the load connections due to the charging of the load capacitors. As seen by the graph 174, the power supply signal remains almost constant (represented by the sinusoidal curves 176a, 176b, 176c for the three phases corresponding to the inverter current curves 171a, 171b, 171c and the output current curves 173a, 173b, 173c in graphs 170 and 172 respectively) under different load conditions, thereby providing a high power quality under different types of loads except during current limit conditions. It should be noted that after the current limit, the signals become again purely sinusoidal. Thus, a user can connect and disconnect components or equipment while power is being supplied and without damaging the components or equipment.

Figure 13:
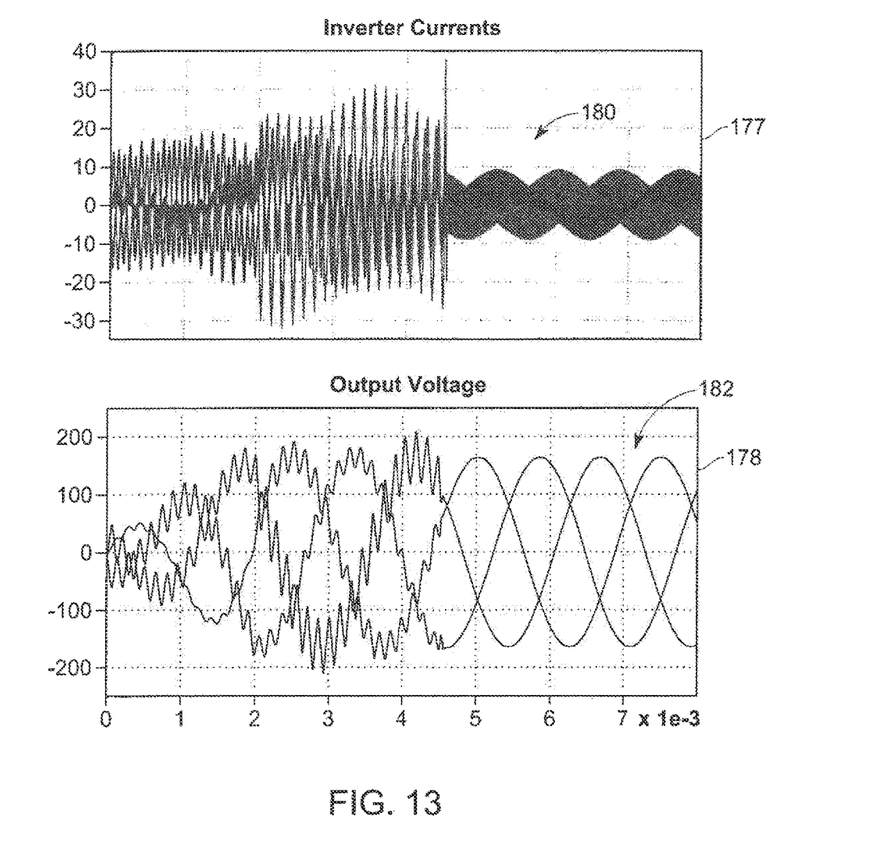
FIG. 13 depicts graphs showing the results of a simulation of active damping in accordance with various embodiments.

The effect of active damping can be seen in the traces 180 and 182 of the graphs 177 and 178. In these traces 180 and 182, the output of the damping signal has been connected only at time t=4.5 ms. As can be seen, prior to t=4.5 ms, the system is oscillating drastically or wildly (e.g., rapid changes). When using a virtual resistor (as described in more detail herein), active damping is provided resulting in signals that are sinusoidal without noise or oscillatory behavior.

In operation, the command signal (VnCmd) may be determined from a look-up table and counter. For example, the voltage (e.g., 210V) for a given frequency (e.g., 400 Hz) is known, such that a given sine wave is defined, and there is a constant amplitude and phase, which for three-phase power, is 120 degrees different for each phase.

Figure 14:
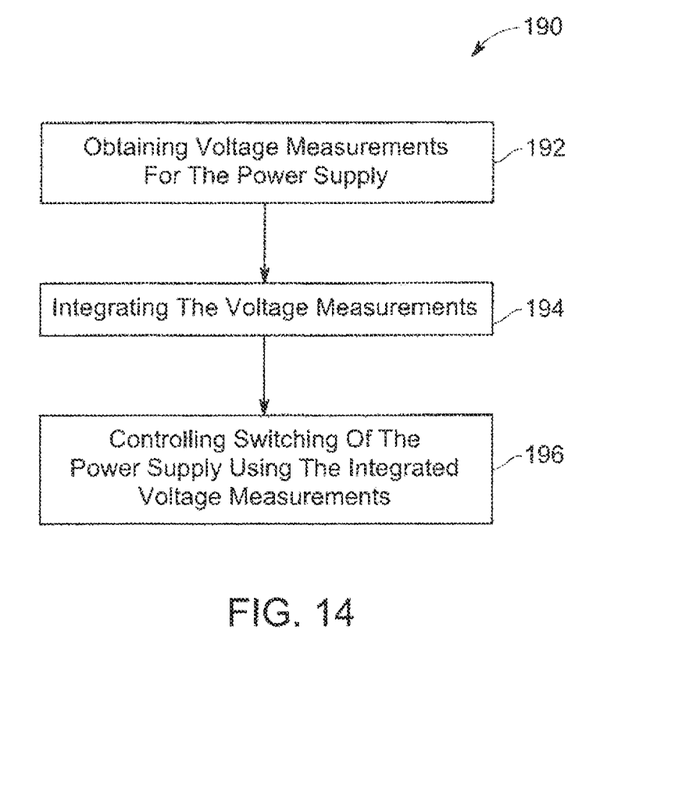
FIG. 14 is a flowchart of a method for controlling switching of a power supply in accordance with various embodiments.

Various embodiments also provide a method 190 for controlling switching of a power supply as shown in FIG. 14. The method includes obtaining voltage measurements for the power supply at 192. For example, the voltage at each of a plurality of terminals (e.g., three terminals) of a PWM converter (providing switching for the power supply) are measured, which in one embodiments, as described herein, is with respect to a fourth wire or terminal that may be connected to a center tap of a DC link capacitor connected to the PWM converter.

The method 190 further includes integrating the voltage measurements at 194. For example, the measured voltage signals are integrated as described herein. It should be noted that the signals may be integrated before or after having a gain applied thereto. Thus, the output signals generated may be an integral of the voltage (volt-seconds output) or an integral of the error (integral of the error of the volt-seconds). The method 190 also includes at 196 controlling the switching of the power supply, for example, by generating output signals from the integrated measured voltage signals (which may be dampened as described herein) to control switching of the PWM converter. Thus, by using the integrated voltage measurements (volt-seconds output or error of volt-seconds) as a control for the switching, fast switching of a power supply may be provided. Accordingly, in various embodiments, instead of using current control or voltage control, volt-seconds control (using integrated measurements) is used for switching a power supply.

Figure 15:
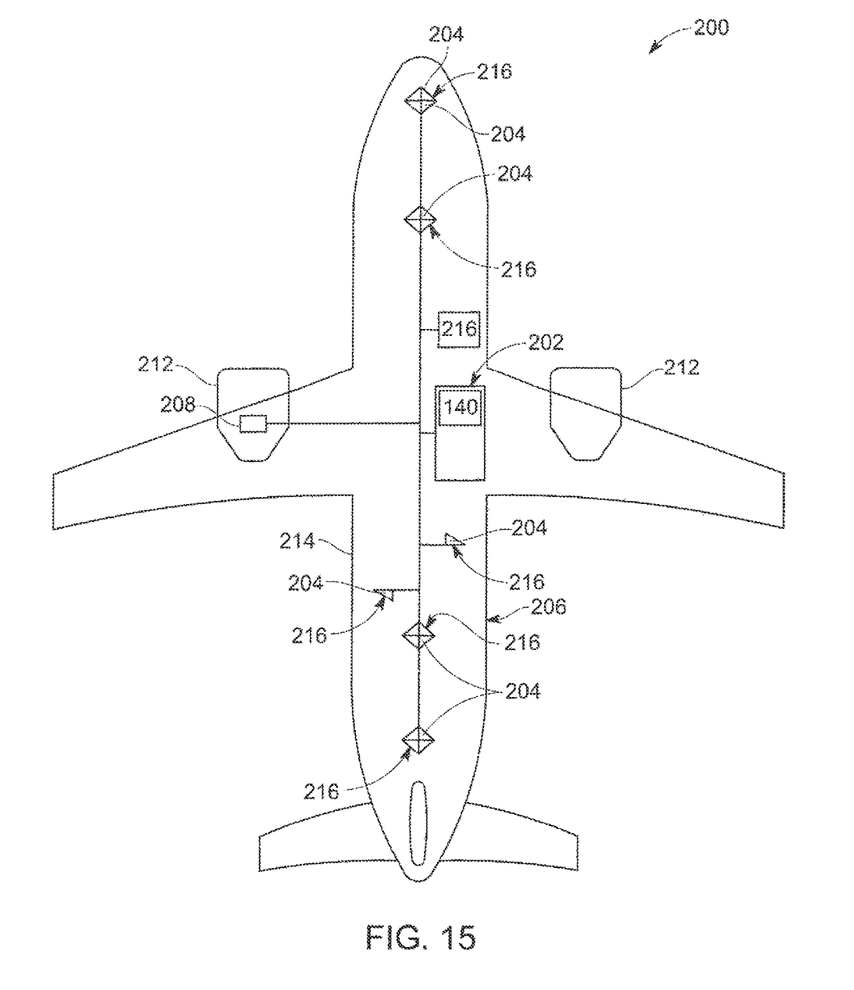
FIG. 15 is a schematic illustration of an embodiment of an aircraft having power controlled in accordance with various embodiments.

Various embodiments may be used to control the supply of electrical power from, for example, an electrical power unit 202 for an aircraft, such as the aircraft 200 shown in FIG. 15. As should be appreciated, the electrical power unit 202 may be used to provide electrical power to one or more electrical components that are located on-board the aircraft. For example, the electrical power unit may be an emergency power unit (EPU) and/or an auxiliary power unit (APU) of the aircraft. The electrical power unit 202 may be used to provide single phase or three phase electrical power to any number of electrical components. Each electrical component may be any type and quantity of electrical component, such as, but not limited to, flight controls, avionics, linked hydraulics, displays, instruments, sensors, galley ovens, heaters, refrigeration units, lighting, fans, de-ice and anti-ice systems, engine management systems, flight management systems, power distribution components, starters, starter-generators, environmental controls, pressurization systems, entertainment systems, microwaves, weapon systems, cameras, signal processors, power distribution components, capacitors, and/or electrical components that process, transmit, and/or relay data, among others.

FIG. 15 is a schematic illustration of an embodiment of the aircraft 200 that includes the electrical power unit 202 that provides electrical power onboard the aircraft 200. In the illustrated embodiment, the aircraft 200 is a fixed wing passenger airplane. The aircraft 200 includes a plurality of electrical components 204, an airframe 206, a primary power unit 208, an auxiliary power unit (APU) 210, one or more engines 212, and the electrical power unit 202. The electrical components 204, the power units 208 and 210, the engine system 212, and the electrical power unit 202 are each located on-board the airframe 214. Specifically, the electrical components 204, the power units 208 and 210, the engine system 212, and the electrical power unit 202 are positioned at various locations on and/or within the airframe 214 such that the electrical components 204, the power units 208 and 210, the engine system 212, and the electrical power unit 202 are carried by the airframe 214 during flight of the aircraft 200.

In one embodiment, the electrical power unit 202 is an EPU of the aircraft 200, for example that is used when both the primary electrical power source 208 and the auxiliary electrical power source 210 have completely or partially failed. Alternatively, the electrical power unit 202 is the APU of the aircraft 200, which is used when the primary power unit 208 completely or partially fails. It should be understood that whether the electrical power unit 202 is an EPU or APU, the electrical power unit 202 may be configured to provide electrical power to one or more electrical components 204 in non-emergency situations.

The primary power unit 208 may be any type of source of electrical power, for example a generation device or a storage device. In the illustrated embodiment, the primary power unit 208 is a turbine generator associated with an engine 212 of the aircraft 200. Other examples of the primary power unit 208 as a generation device include, but are not limited to, electrical generators and/or solar cells, among others. Examples of the primary power unit 208 as a storage device include, but are not limited to, fuel cells, batteries, flywheels, and/or capacitors, among others. Although shown as being located at an engine 212 of the aircraft 202, the primary power unit 208 may be located at any other location along the airframe 214. Moreover, the aircraft 200 may include any number of the primary power units 208.

The APU 210 may be any type of source of electrical power, for example a generation device or a storage device. In the illustrated embodiment, the APU 210 is a storage device. Examples of the APU 210 as a storage device include, but are not limited to, fuel cells, batteries, flywheels, and/or capacitors, among others. Examples of the APU 210 as a generation device include, but are not limited to, turbine generators, electrical generators, and/or solar cells, among others. The APU 210 may be located at any location along the airframe 214. The aircraft 200 may include any number of the APUs 210.

Sub-sets 216 of the electrical components 204 are shown in FIG. 15 at various locations along the airframe 214. Each sub-set 216 may include any number of electrical components 204. In some embodiments, one or more sub-sets 216 only include a single electrical component 204. When a sub-set 216 includes two or more electrical components 204, all of the electrical components 204 of the sub-set 216 may be of the same type or the sub-set 216 may include two or more different types of electrical components 204. The aircraft 200 may include any number of the sub-sets 216.

The locations and pattern of sub-sets 216 along the airframe 214 shown in FIG. 14 are for example only. Each sub-set 216 may have any other location along the airframe 214 and the sub-sets 216 may be arranged in any other pattern relative to each other. Moreover, the electrical components 204 of the same sub-set 216 are shown in FIG. 14 as grouped together at the same location along the airframe 214 for illustrative purposes only. The electrical components 204 of the same sub-set 216 need not be located at the same location along the airframe 214. Rather, each electrical component 204 may have any location along the airframe 214, whether or not such location is the same, or adjacent to, the location of one or more other electrical components 204 of the same sub-set 216. In some embodiments, the electrical components are grouped together in the sub-sets 216 based on corresponding power distribution modules (not shown) that are common to groups (i.e., the sub-sets 216) of the electrical components 204.

Each electrical component 204 of each sub-set 216 may be any type of electrical component. Examples of the electrical components 204 include, but are not limited to, flight controls, linked hydraulics, avionics, displays, instruments, sensors, galley ovens, heaters, refrigeration units, lighting, fans, de-ice and anti-ice systems, engine management systems, flight management systems, power distribution components, starters, starter-generators, environmental controls, pressurization systems, entertainment systems, microwaves, weapon systems, cameras, signal processors, power distribution components, capacitors, and/or electrical components that process, transmit, and/or relay data, among others.

The sub-sets 216 are electrically connected to the primary power unit 208, the APU 210, and the electrical power unit 202 such that each electrical component 204 is configured to receive electrical power from the primary power unit 208, the APU 210, and/or the electrical power unit 202, such as controlled by the control system 140. In the illustrated embodiment, each electrical component 204 of each sub-set 216 is electrically connected to each of the units 208, 210, and 202. In other words, each unit 208, 210, and 202 is configured to supply electrical power to all of the electrical components 204. Alternatively, one or more of the electrical components 204 may not be electrically connected to the primary power unit 208, the APU 210, or the electrical power unit 202. In other words, in some alternative embodiments, the primary power unit 208, the APU 210, and/or the electrical power unit 202 only supply electrical power to some of the electrical components 204. For example, the APU 210 and/or the electrical power unit 202 may only be electrically connected to electrical components 204 that are required during emergency situations (e.g., electrical components 204 that are critical and/or vital to safe operation of the aircraft 200, such as, but not limited to, flight controls, instruments, linked hydraulics, avionics, displays, sensors, lighting, de-ice and anti-ice systems, engine management systems, flight management systems, environmental controls, pressurization systems, and/or weapon systems, among others).

Thus, various embodiment control (e.g., generate control signals based on) the integral of the voltage or the integral of the volt-seconds instead of controlling the actual voltage (e.g., using voltage or current control), which is a square wave and can be difficult to control. For example, with respect to FIG. 1, various embodiments regulate or control the integral of V1, V2 and V3 instead of the voltages. By integrating the square wave, a wave that appears similar to sine wave is generated and used to control the voltage supply. Accordingly, for example, and referring again to FIG. 1, the output signals V1F, V2F and V3F can be controlled using a configuration with comparators.

It should be noted that the various embodiments may be implemented in hardware, software or a combination thereof. The various embodiments and/or components, for example, the modules, or components and controllers therein, also may be implemented as part of one or more computers or processors. The computer or processor may include a computing device, an input device, a display unit and an interface, for example, for accessing the Internet. The computer or processor may include a microprocessor. The microprocessor may be connected to a communication bus. The computer or processor may also include a memory. The memory may include Random Access Memory (RAM) and Read Only Memory (ROM). The computer or processor further may include a storage device, which may be a hard disk drive or a removable storage drive such as a solid state drive, optical disk drive, and the like. The storage device may also be other similar means for loading computer programs or other instructions into the computer or processor.

As used herein, the term "computer" or "module" may include any processor-based or microprocessor-based system including systems using microcontrollers, reduced instruction set computers (RISC), ASICs, logic circuits, and any other circuit or processor capable of executing the functions described herein. The above examples are exemplary only, and are thus not intended to limit in any way the definition and/or meaning of the term "computer".

The computer or processor executes a set of instructions that are stored in one or more storage elements, in order to process input data. The storage elements may also store data or other information as desired or needed. The storage element may be in the form of an information source or a physical memory element within a processing machine.

The set of instructions may include various commands that instruct the computer or processor as a processing machine to perform specific operations such as the methods and processes of the various embodiments. The set of instructions may be in the form of a software program. The software may be in various forms such as system software or application software and which may be embodied as a tangible and non-transitory computer readable medium. Further, the software may be in the form of a collection of separate programs or modules, a program module within a larger program or a portion of a program module. The software also may include modular programming in the form of object-oriented programming. The processing of input data by the processing machine may be in response to operator commands, or in response to results of previous processing, or in response to a request made by another processing machine.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure.

What is claimed is:

1. A control system for a power supply, the control system comprising:
    an input configured for receiving voltage measurement signals for the power supply;
    a controller for one or more electrical phases of the power supply, the controller having an integrator configured to integrate the voltage measurement signals and to generate integrated control signals or integrated error signals, the controller configured to generate an output signal using the integrated control signals or the integrated error signals; and
    an output configured to output the output signal to control switching of the power supply.

2. The control system of claim 1, wherein the integrator comprises a scaled integrator for integrating the voltage measurement signals and further comprising a comparator connected to the output of the scaled integrator, the comparator configured to compare a command signal and an output of the scaled integrator to generate the integrated error signals, as volt-seconds error signals.

3. The control system of claim 2, wherein the scaled integrator comprises a unity gain integrator.

4. The control system of claim 1, wherein the controller further comprises a comparator with hysteresis control, the comparator configured to generate the integrated control signals or integrated error signals.

5. The control system of claim 4, wherein the controller further comprises a hysteresis control device coupled to the comparator with hysteresis control and configured to change a band of the hysteresis to maintain a constant output frequency of the comparator.

6. The control system of claim 5, wherein the hysteresis control device is configured to generate a floating absolute value of an integrated command signal to change the band of the hysteresis.

7. The control system of claim 1, further comprising a resonance damping circuit connected to the controller to generate a virtual resistance for active damping to generate the output signal, as a sinusoidal signal.

8. The control system of claim 1, further comprising a dead-zone module configured to limit a current input to the controller using a floating absolute value of the received voltage measurement signals.

9. The control system of claim 1, wherein the voltage measurement signals are square wave signals.

10. The control system of claim 1, wherein the controller comprises a field-programmable gate array (FPGA), and wherein the integrator is formed from one or more counters.

11. The control system of claim 1, wherein the power supply comprises a multi-phase power supply connected to a load with a neutral line and the voltage measurement signals are acquired from a center tap of a DC link capacitor connected to a converter controlling switching of the power supply and to the neutral line of the load.

12. A power supply, comprising:
a power source;
a switching device configured to control switching of the power source; and
a controller connected to the switching device and configured to receive voltage measurement signals for the power source and integrate a voltage of the voltage measurement signals or integrate a voltage error of the voltage measurement signals to generate a control signal to control operation of the switching device.

13. The power supply of claim 12, wherein the switching device is a Silicon Carbide (SiC) pulse width modulated (PWM) converter including a plurality of switching transistors, wherein the voltage measurement signals comprise volt-seconds output measured at an output of the SiC PWM converter and wherein the controller is configured to provide hysteresis control of the volt-seconds output.

14. The power supply of claim 13, wherein the controller is configured to generate a floating absolute value of an integrated command signal to change a band of hysteresis for the hysteresis control.

15. The power supply of claim 12, wherein the power source comprises a three-phase power supply with a fourth wire generating a neutral of a load and connected to a center of a converter capacitor.

16. The power supply of claim 15, wherein the voltage measurement signals are acquired from a center tap of a DC link capacitor connected to a PWM converter.

17. The power supply of claim 12, further comprising a resonance damping circuit connected to the controller to generate a virtual resistance.

18. A method for controlling switching of a power supply, the method comprising:
obtaining voltage measurements for the power supply, the voltage measurements comprising square wave signals;
integrating the voltage measurements; and
controlling switching of the power supply using integrated voltage measurements.

19. The method of claim 18, wherein controlling the switching comprises performing hysteresis control using a floating absolute value of a command signal to modify a hysteresis band.

20. The method of claim 18, wherein integrating the voltage measurements comprises one of integrating a corresponding voltage or a corresponding voltage error.

* * * * *